June 14, 1938.  G. V. FEESE  2,120,437
MACHINE FOR THE INTRODUCTION OF MOISTURE TO WHEAT OR THE LIKE
Filed Jan. 31, 1935
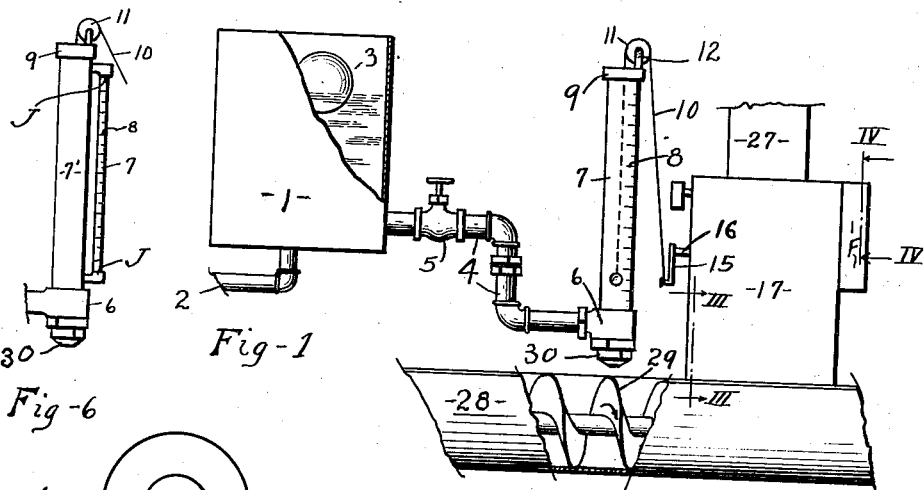
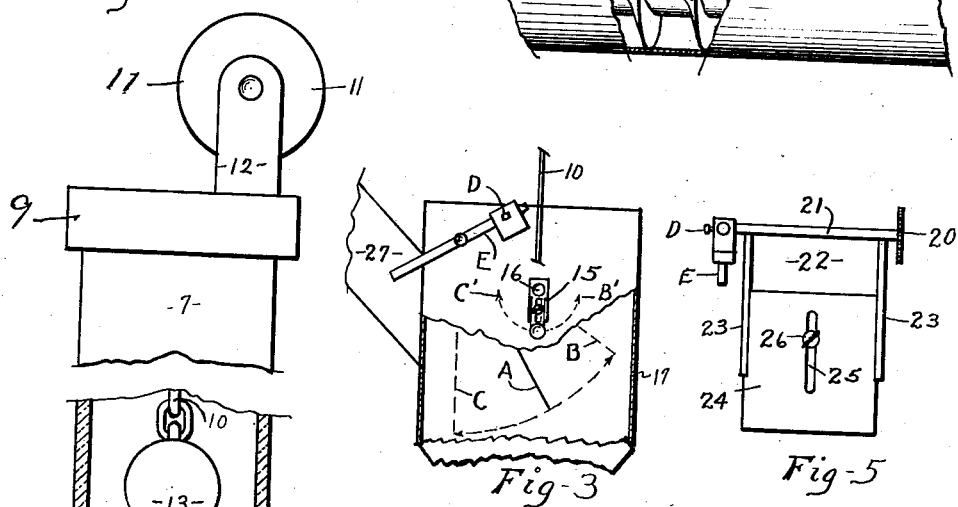
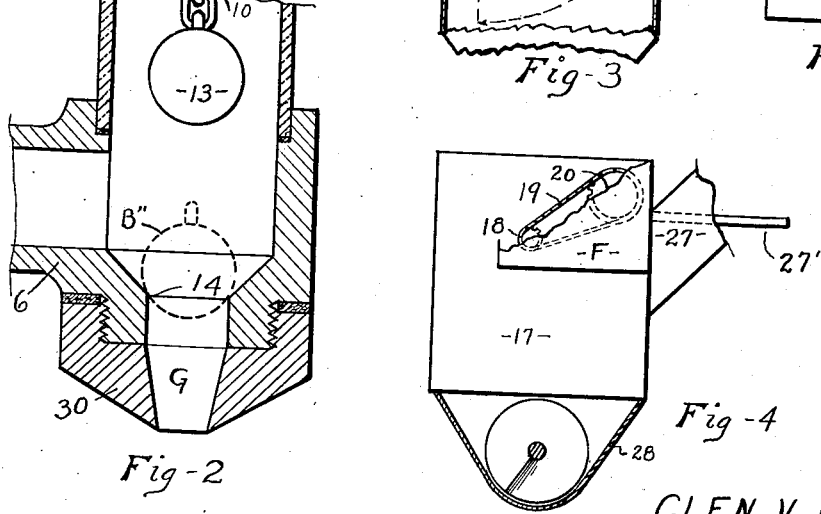
INVENTOR.
GLEN V. FEESE
BY U. G. Charles
ATTORNEY.

Patented June 14, 1938

2,120,437

UNITED STATES PATENT OFFICE 2,120,437

MACHINE FOR THE INTRODUCTION OF MOISTURE TO WHEAT OR THE LIKE

Glen V. Feese, Wichita, Kans., assignor of one-half to Kansas Milling Co., Wichita, Kans., a corporation of Kansas Application January 31, 1935, Serial No. 4,418

1 Claim. (Cl. 83—28)

My invention relates to a machine for introduction of moisture to wheat or the like.

The object of my invention is to provide an automatic control of the moisture to the wheat while being conveyed from the elevator to the tempering bin.

A further object of my invention is to provide a machine having a tank and supply valve with float control for the water contained therein and a transparent gauge in working relation to the tank as a means to determine the quantity of water dispensed into the wheat as the latter is conveyed to the tempering bin, the gauge having a series of graduation marks spaced therealong.

A still further object of my invention is to provide a machine with a plate acted upon by the flow of wheat passing from a gravity chute to a worm conveyor, the plate action to control a valve at the lower extremity of a gauge positioned in working relation to the said worm conveyor.

A still further object of my invention is to provide a machine comprising a supply tank, a water gauge and a baffle plate for the introduction of moisture to a moving body of wheat from an elevator to a tempering bin, the tank and gauge being connected by a pipe having a check valve therein, the gauge having a ball valve fitting on the lower end to receive a nozzle, a plurality of which are available, each thereof having an orifice of different diameter, the plate being adjustable longitudinally.

These and other objects will hereinafter be more fully explained reference being had to the accompanying drawing forming a part of this specification and in which like characters will apply to like parts in the different views.

Referring to the drawing:—

Fig. 1 is a side view of the machine assembled in working position, parts removed for convenience of illustration.

Fig. 2 is an enlarged view of the gauge, fitting, nozzle and apertured portion of the conveyor tube.

Fig. 3 is an inside view of the baffle plate housing, partly in section taken on line 3—3 in Fig. 1.

Fig. 4 is an opposite or outside view of Fig. 3, the gear housing partly removed the view thereof taken on line 4—4 in Fig. 1.

Fig. 5 is a side view of the adjustable baffle plate and pivotal means therefor.

Fig. 6 is a modification of the gauge arrangement.

My invention herein disclosed consists of a tank 1, as a container for water having a supply pipe 2 at the lower extremity thereof, the tank being equipped with a float valve control, the float being indicated as at 3 the valve not shown in the drawing. Near the lower extremity of the said tank is a pipe line 4 connected therewith and having a valve 5 to open and close the same, the other end of the said pipe line has a fitting 6 secured thereto, upon which is mounted a glass gauge 7 communicating therewith and adapted to receive water from the tank for the purpose later described, the said gauge having graduations 8 spaced therealong, and a cap 9 secured to the upper end thereof, the said cap being centrally apertured to receive a cable 10 slidable therein, the said cable being supported by a sheave 11 trunnioned in bearings 12 secured to and upwardly extending from the said cap 9.

Secured to the lower end of the cable portion passing through the gauge is a ball 13 adapted to engage with a seat 14 positioned in the said fitting 6, functioning as a ball valve and being actuated to an open or closed position through the medium of an arm 15, to which the other end of the cable is attached; the said arm being secured to one end of a shaft 16 that is trunnioned in opposite sides of a housing 17, the said shaft has on the other end thereof, a sprocket wheel 18 upon which a chain 19 will engage, the said chain is also in mesh with a sprocket wheel 20, that is secured to a shaft 21 trunnioned in the walls of the said housing 17, as pendant supporting means for a plate reciprocatingly arranged, the said plate being adjustable longitudinally and consisting of an upper member 22 that is rigidly secured to the shaft, and having a guide 23 secured to each side edge thereof to engage a lower member 24 slidable therein, the last said member has an elongated slot 25 centrally positioned and through which a bolt extends and being secured to the first said member 22, the said bolt has a wing nut 26 threadedly engaging thereon as means to bind the said members firmly together at a desired length for the said plate that is rockably positioned in close proximity to the spout 27, by which means when the plate is rocked by wheat flowing inward and through said housing 17 on its way to a spiral conveyor and to which said housing 17 is attached functioning as a hopper, the said conveyor consists of a tube 28 having a worm conveyor 29 revolvably arranged therein to discharge the moistened wheat into a tempering bin, the principle of which is to absorb the required moisture for the process of making flour, and being so tempered the bran particles are of sufficient size to pass over the bolting silk while the flour is sifted therethrough.

Inasmuch as it is essential to attain the above accurately, my improvement herein disclosed has given complete satisfaction in that the moisture is controlled automatically by the flow of the wheat.

The reciprocating movement of the said plate is controlled by wheat contacting therewith as previously stated and we will assume that the normal flow of the wheat will position the plate as shown at A in Fig. 3, in which position the said ball valve is opened by raising the ball as shown in Figs. 1 and 2, should the wheat fill the housing excessively, or cease to flow therefrom freely, the position of the said plate will be approximately as shown at B closing the valve, as the rock of the said arm 15 will move in the same direction to a point B' releasing the cable 10, causing said valve to close as shown by dotted lines B'', and when rocked in the opposite direction to an assumed point as at dotted lines C for the plate and C' for the arm, the valve is likewise closed, the latter position being caused by closing cut off 27' slidably positioned in said spout 27. The position B of the plate as described is caused by congestion of wheat in the housing or by failure of the spiral conveyor in its function.

It will be understood that the said plate is tensioned toward the spout opening through the medium of a counter balance D, adjustably carried by a lever E that is secured to the outer end of the said shaft 21, to insure prompt movement of the plate to the position indicated by dotted lines C, closing ball valve automatically when the flow of wheat from the spout is discontinued.

The co-rocking movement of arm 15 and the said plate is through the medium of the sprocket and chain arrangement above described, the ratio of which is proportioned to insure a rocking movement of 180 degrees for the arm as shown by dotted lines in Fig. 3, the said gear arrangement is inclosed by a plate F, as a safety guard and dust proof means.

Threadedly engaging on the lower side of fitting 6 and in axial alignment with the said gauge 7 is a nozzle 30 having an orifice G extending therethrough and in registry with an aperture H in the said tube 28, as an entrance for water passing through the nozzle into wheat that is being moved by the said worm conveyor, the quantity of water is governed by the size of the orifice in the nozzle, a plurality of which are available as above stated and at all times the orifice should congest the flow sufficient to cause rising of the water in the tubular gauge to a desired point along the graduation marks, said marks to be numbered but not shown in the drawing, by which means the quantity of water introduced is discernible and being calculated on the basis of the volume of wheat conveyed and also subject to being checked by irregularity of the wheat flow as above described.

While I have shown a tubular glass gauge as in Fig. 1, I do not wish to be confined to such alone as the function thereof is equally performed by the arrangement in Fig. 6, in which case I provide a metallic tube or pipe 7', and place on the other side thereof a water gauge having upper and lower connections J, communicating with pipe 7' to indicate the depth of water contained in said pipe, and the said arm 15 may be in one piece as indicated in Fig. 1, eliminating the expense of two members slidably engaging and means to secure the same together, and such other modification may be employed as lie within the scope of the appended claim.

Having thus described my invention, what I claim as new and desire to secure by Letters Patent is:

In a moisture control for wheat or the like, in combination with a wheat conducting spout and a wheat conveyor, a housing functioning as a hopper for the said conveyor and being attached thereto and communicating with the interior thereof, the conveyor having an opening through its upper portion, a water supply and ball valve therefor, the valve having a nozzle in registry with the opening in the conveyor as means to inject water therein, the said spout arranged to discharge wheat in one side of the housing medially thereof and from thence to the conveyor, the housing having a plate pendentally trunnioned therein adjacent the spout, a shaft trunnioned in the housing, said shaft having a crank arm on one end and a sprocket wheel on the other end, said crank and sprocket external of the housing, and a sprocket wheel secured to the pendent supporting means of the plate, said sprockets having a chain in mesh therewith, by which means, when the plate is rocked by wheat from the spout, the crank is rocked as closing means for the said ball valve and opening means therefor when the plate is disengaged by the wheat or the housing congested therewith, all substantially as shown and described.

GLEN V. FEESE.